(12) United States Patent
Asgari

(10) Patent No.: US 7,780,875 B2
(45) Date of Patent: Aug. 24, 2010

(54) COMPOSITE MATERIALS CONTAINING CARBON NANOPARTICLES

(75) Inventor: Soheil Asgari, Wiesbaden (DE)

(73) Assignee: Cinvention AG, Wiesbaden (DE)

( * ) Notice: Subject to any disclaimer, the term of this patent is extended or adjusted under 35 U.S.C. 154(b) by 0 days.

(21) Appl. No.: 11/331,753

(22) Filed: Jan. 13, 2006

(65) Prior Publication Data

US 2006/0155376 A1   Jul. 13, 2006

Related U.S. Application Data

(60) Provisional application No. 60/643,842, filed on Jan. 13, 2005.

(51) Int. Cl.
*H01B 1/00* (2006.01)
(52) U.S. Cl. .................. 252/502; 252/511; 423/447.2; 516/98; 524/449; 524/492; 524/495
(58) Field of Classification Search ............... 252/500, 252/88.2, 511; 156/296; 430/56; 424/502; 516/98; 423/446, 447.2; 419/11; 385/16; 523/200; 524/442, 449, 492, 495
See application file for complete search history.

(56) References Cited

U.S. PATENT DOCUMENTS

| | | | |
|---|---|---|---|
| 1,993,039 A | 3/1935 | Reitmann | |
| 2,551,696 A | 5/1951 | Ogurkowski | |
| 2,705,726 A | 4/1955 | Archer | |
| 2,895,988 A | 7/1959 | Archer | |
| 3,015,128 A | 1/1962 | Somerville | |
| 3,018,262 A | 1/1962 | Schroeder | |
| 3,111,396 A | 11/1963 | Ball | |
| 3,171,820 A | 3/1965 | Volz | |
| 3,293,114 A | 12/1966 | Kenage et al. | |
| 3,401,475 A | 9/1968 | Morehouse et al. | |
| 3,476,802 A | 11/1969 | Holtermann et al. | |
| 3,479,811 A | 11/1969 | Walters | |
| 3,488,714 A | 1/1970 | Walters et al. | |
| 3,489,555 A | 1/1970 | Thellmann | |
| 3,594,326 A | 7/1971 | Himmel | |
| 3,615,972 A | 10/1971 | Morehouse, Jr. | |
| 3,618,614 A | 11/1971 | Flynn | |
| 3,732,172 A | 5/1973 | Herbig et al. | |
| 3,871,950 A | 3/1975 | Hashino et al. | |
| 3,945,956 A | 3/1976 | Garner | |
| 4,005,188 A | 1/1977 | Tilly et al. | |

(Continued)

FOREIGN PATENT DOCUMENTS

BE    836355    6/1976

(Continued)

OTHER PUBLICATIONS

Larry L. Hench et al., "The Sol-Gel Process", Chem. Rev. 1990, 90, pp. 33-72.

(Continued)

*Primary Examiner*—Mark Kopec
*Assistant Examiner*—Khanh Tuan Nguyen
(74) *Attorney, Agent, or Firm*—Dorsey & Whitney LLP

(57) ABSTRACT

The present invention relates to a process of producing composite materials by a sol/gel-process, comprising carbon nanoparticles and organic polymer material. The invention further relates to composite materials, which are manufactured with the use of said sol/gel technology.

20 Claims, 3 Drawing Sheets

U.S. PATENT DOCUMENTS

| | | |
|---|---|---|
| 4,108,806 A | 8/1978 | Cohrs et al. |
| 4,179,546 A | 12/1979 | Garner et al. |
| 4,314,055 A | 2/1982 | Hoey et al. |
| 4,420,442 A | 12/1983 | Sands |
| 4,421,562 A | 12/1983 | Sands |
| 4,452,773 A | 6/1984 | Molday |
| 4,469,863 A | 9/1984 | Ts'o et al. |
| 4,540,629 A | 9/1985 | Sands et al. |
| 4,549,892 A | 10/1985 | Baker et al. |
| 4,675,173 A | 6/1987 | Widder |
| 4,722,344 A | 2/1988 | Cambron et al. |
| 4,770,183 A | 9/1988 | Groman et al. |
| 4,822,534 A | 4/1989 | Lencki et al. |
| 4,885,363 A | 12/1989 | Tweedle et al. |
| 4,898,734 A | 2/1990 | Mathiowitz et al. |
| 5,034,506 A | 7/1991 | Summerton et al. |
| 5,087,440 A | 2/1992 | Cacheris et al. |
| 5,155,215 A | 10/1992 | Ranney |
| 5,177,170 A | 1/1993 | Sarpeshkar et al. |
| 5,188,816 A | 2/1993 | Sherry et al. |
| 5,190,657 A | 3/1993 | Heagle et al. |
| 5,213,612 A | 5/1993 | Minnear et al. |
| 5,216,141 A | 6/1993 | Benner |
| 5,219,553 A | 6/1993 | Kraft et al. |
| 5,228,900 A | 7/1993 | Stephens et al. |
| 5,235,033 A | 8/1993 | Summerton et al. |
| 5,242,683 A | 9/1993 | Klaveness |
| 5,262,532 A | 11/1993 | Tweedle et al. |
| 5,290,830 A | 3/1994 | Tung et al. |
| 5,322,679 A | 6/1994 | Bacon et al. |
| 5,338,571 A * | 8/1994 | Mirkin et al. ............... 427/299 |
| 5,346,690 A | 9/1994 | Gundersen et al. |
| 5,346,981 A | 9/1994 | Sarpeshkar et al. |
| 5,358,704 A | 10/1994 | Desreux et al. |
| 5,386,023 A | 1/1995 | Sanghvi et al. |
| 5,466,440 A | 11/1995 | Ruddy et al. |
| 5,518,187 A | 5/1996 | Bruno et al. |
| 5,554,386 A | 9/1996 | Groman et al. |
| 5,573,752 A | 11/1996 | Ranganathan et al. |
| 5,580,579 A | 12/1996 | Ruddy et al. |
| 5,582,814 A | 12/1996 | Scott et al. |
| 5,602,240 A | 2/1997 | DeMesmaeker et al. |
| 5,637,197 A | 6/1997 | Watt et al. |
| 5,637,684 A | 6/1997 | Cook et al. |
| 5,643,502 A * | 7/1997 | Nahass et al. ............... 252/511 |
| 5,644,048 A | 7/1997 | Yau |
| 5,688,486 A | 11/1997 | Watson |
| 5,718,388 A | 2/1998 | Czekai et al. |
| 5,830,430 A | 11/1998 | Unger et al. |
| 5,858,462 A | 1/1999 | Yamazaki |
| 5,900,228 A | 5/1999 | Meade et al. |
| 5,948,428 A | 9/1999 | Lee et al. |
| 6,048,546 A | 4/2000 | Sasaki et al. |
| 6,066,272 A | 5/2000 | Tang et al. |
| 6,187,823 B1 * | 2/2001 | Haddon et al. ............... 516/32 |
| 6,203,814 B1 * | 3/2001 | Fisher et al. ............... 424/443 |
| 6,207,133 B1 | 3/2001 | Reszka et al. |
| 6,232,295 B1 | 5/2001 | Kayyam et al. |
| 6,255,241 B1 | 7/2001 | Miyazawa et al. |
| 6,380,281 B1 | 4/2002 | Gooch et al. |
| 6,391,808 B1 | 5/2002 | Stiegman |
| 6,479,033 B1 | 11/2002 | Reszka et al. |
| 6,497,729 B1 | 12/2002 | Moussy et al. |
| 6,521,808 B1 | 2/2003 | Ozkan et al. |
| 6,543,107 B1 | 4/2003 | Miyashita et al. |
| 6,652,835 B1 | 11/2003 | Lauffer et al. |
| 6,660,248 B2 | 12/2003 | Wilson et al. |
| 6,720,028 B1 | 4/2004 | Haaland |
| 6,749,554 B1 | 6/2004 | Snow et al. |
| 6,749,712 B2 * | 6/2004 | Kuper ............... 156/296 |
| 6,782,154 B2 * | 8/2004 | Zhao et al. ............... 385/16 |
| 6,783,745 B1 * | 8/2004 | Voronov et al. ............... 423/446 |
| 6,808,720 B2 | 10/2004 | Unger |
| 6,811,766 B1 | 11/2004 | Eriksen et al. |
| 7,195,780 B2 * | 3/2007 | Dennis et al. ............... 424/502 |
| 7,223,811 B2 * | 5/2007 | Nagy et al. ............... 524/442 |
| 7,226,953 B1 * | 6/2007 | Petruska et al. ............... 516/98 |
| 7,309,727 B2 * | 12/2007 | Elkovitch et al. ............... 524/449 |
| 2001/0023734 A1 | 9/2001 | Tavakoli et al. |
| 2001/0027946 A1 | 10/2001 | Fukuda et al. |
| 2002/0031706 A1 | 3/2002 | Dasgupta et al. |
| 2002/0092613 A1 * | 7/2002 | Kuper ............... 156/296 |
| 2002/0102196 A1 * | 8/2002 | Smalley et al. ............... 422/198 |
| 2002/0122828 A1 | 9/2002 | Liu |
| 2002/0142413 A1 | 10/2002 | Brady et al. |
| 2002/0160176 A1 | 10/2002 | Pinnavaia et al. |
| 2003/0044593 A1 | 3/2003 | Vaidyanathan et al. |
| 2003/0078671 A1 | 4/2003 | Lesniak et al. |
| 2003/0089881 A1 | 5/2003 | Purizhansky |
| 2003/0089893 A1 * | 5/2003 | Niu et al. ............... 252/500 |
| 2003/0096151 A1 | 5/2003 | Blunk et al. |
| 2003/0116877 A1 | 6/2003 | Liao et al. |
| 2003/0157852 A1 | 8/2003 | Honna |
| 2003/0166758 A1 | 9/2003 | Barkac et al. |
| 2003/0180263 A1 | 9/2003 | Geistlich |
| 2003/0186035 A1 | 10/2003 | Cruce et al. |
| 2003/0201223 A1 | 10/2003 | Cheng et al. |
| 2003/0201580 A1 | 10/2003 | Christensen et al. |
| 2003/0203980 A1 * | 10/2003 | Valdes ............... 516/99 |
| 2003/0205528 A1 | 11/2003 | Stucky et al. |
| 2003/0218857 A1 | 11/2003 | Omori et al. |
| 2004/0108617 A1 | 6/2004 | Kwag et al. |
| 2004/0118579 A1 | 6/2004 | McCutcheon et al. |
| 2004/0136894 A1 * | 7/2004 | Yoshizawa et al. ......... 423/447.2 |
| 2004/0192838 A1 | 9/2004 | Destarac et al. |
| 2004/0197392 A1 | 10/2004 | Loekling et al. |
| 2004/0214810 A1 | 10/2004 | Lee et al. |
| 2004/0219093 A1 * | 11/2004 | Kim et al. ............... 423/447.2 |
| 2004/0235984 A1 * | 11/2004 | Nicholl et al. ............... 523/200 |
| 2004/0247895 A1 | 12/2004 | Dreja et al. |
| 2005/0032246 A1 | 2/2005 | Brennan et al. |
| 2005/0043585 A1 | 2/2005 | Datta et al. |
| 2005/0043816 A1 | 2/2005 | Datta et al. |
| 2005/0048193 A1 | 3/2005 | Li et al. |
| 2005/0061325 A1 | 3/2005 | Michaels |
| 2005/0070657 A1 * | 3/2005 | Elkovitch et al. ............... 524/495 |
| 2005/0079201 A1 | 4/2005 | Rathenow et al. |
| 2005/0079352 A1 | 4/2005 | Glorioso et al. |
| 2005/0080402 A1 | 4/2005 | Santamore et al. |
| 2005/0107478 A1 * | 5/2005 | Klimov et al. ............... 516/98 |
| 2005/0136348 A1 * | 6/2005 | Wu et al. ............... 430/56 |
| 2005/0154116 A1 * | 7/2005 | Nagy et al. ............... 524/492 |
| 2005/0158399 A1 | 7/2005 | Yu et al. |
| 2005/0186104 A1 * | 8/2005 | Kear et al. ............... 419/11 |
| 2006/0155376 A1 | 7/2006 | Asgari |
| 2006/0159718 A1 | 7/2006 | Rathenow et al. |
| 2006/0167147 A1 | 7/2006 | Asgari |
| 2006/0171990 A1 | 8/2006 | Asgari |
| 2006/0177379 A1 | 8/2006 | Asgari |
| 2006/0202168 A1 * | 9/2006 | Barrera et al. ............... 252/500 |
| 2006/0211802 A1 | 9/2006 | Asgari |
| 2007/0003749 A1 | 1/2007 | Asgari |
| 2007/0003753 A1 | 1/2007 | Asgari |
| 2007/0013094 A1 | 1/2007 | Bischofsberger et al. |
| 2007/0088114 A1 | 4/2007 | Asgari |

FOREIGN PATENT DOCUMENTS

| | | |
|---|---|---|
| BE | 846657 | 1/1977 |
| BE | 882309 | 7/1980 |
| CA | 1336164 | 7/1995 |
| CA | 1336218 | 7/1995 |
| CH | 480071 | 12/1969 |
| CH | 494197 | 1/1971 |

| | | |
|---|---|---|
| CN | 1224622 | 8/1999 |
| CN | 1262692 | 8/2000 |
| DE | 67209 | 6/1969 |
| DE | 2031724 | 1/1971 |
| DE | 2050217 | 4/1972 |
| DE | 2328610 | 1/1974 |
| DE | 2229360 | 7/1974 |
| DE | 2456685 | 6/1975 |
| DE | 2405652 | 8/1975 |
| DE | 2909439 | 9/1980 |
| DE | 2925969 | 1/1981 |
| DE | 3001292 | 7/1981 |
| DE | 3407473 | 9/1985 |
| DE | 0300543 | 7/1987 |
| DE | 4035187 | 7/1992 |
| DE | 0680753 | 5/1995 |
| DE | 19603033 | 7/1997 |
| DE | 19651774 | 6/1998 |
| DE | 19729013 | 2/1999 |
| DE | 19826756 | 1/2000 |
| DE | 19917713 | 10/2000 |
| DE | 10037656 | 2/2002 |
| DE | 10151791 | 7/2002 |
| DE | 1 0132441 | 1/2003 |
| DE | 19948651 | 7/2003 |
| DE | 202004009060 | 9/2004 |
| EP | 0022056 | 6/1980 |
| EP | 0026281 | 7/1980 |
| EP | 0033426 | 8/1981 |
| EP | 0049745 | 8/1981 |
| EP | 0083964 | 7/1983 |
| EP | 0105752 | 4/1984 |
| EP | 0108638 | 5/1984 |
| EP | 0458079 | 4/1991 |
| EP | 0487477 | 5/1992 |
| EP | 0764489 | 3/1997 |
| EP | 1092472 | 4/2001 |
| EP | 1352915 | 6/2001 |
| EP | 1130053 | 9/2001 |
| EP | 1205492 | 5/2002 |
| EP | 1240215 | 9/2002 |
| EP | 1331226 | 7/2003 |
| EP | 1439248 | 7/2004 |
| EP | 1477191 | 11/2004 |
| FR | 6777 | 3/1969 |
| GB | 315681 | 7/1929 |
| GB | 870321 | 6/1961 |
| GB | 949722 | 2/1964 |
| GB | 1044680 | 10/1966 |
| GB | 1346796 | 2/1974 |
| GB | 1419127 | 12/1975 |
| GB | 1548594 | 7/1979 |
| JP | 62286534 | 12/1987 |
| JP | 2005-003687 * | 1/2005 |
| SE | 344166 | 4/1972 |
| WO | 8301738 | 5/1983 |
| WO | 8303920 | 11/1983 |
| WO | 8502772 | 7/1985 |
| WO | 8700757 | 2/1987 |
| WO | 8800060 | 1/1988 |
| WO | 8903675 | 5/1989 |
| WO | 9001295 | 2/1990 |
| WO | 9001899 | 3/1990 |
| WO | 9209267 | 6/1992 |
| WO | 9305819 | 4/1993 |
| WO | 93 15768 | 8/1993 |
| WO | 9315768 | 8/1993 |
| WO | 95 03036 | 2/1995 |
| WO | 96 03117 | 2/1996 |
| WO | 9611712 | 4/1996 |
| WO | 9618402 | 6/1996 |
| WO | 9705904 | 2/1997 |
| WO | 9711950 | 4/1997 |
| WO | 9714443 | 4/1997 |
| WO | 9721431 | 6/1997 |
| WO | 9726017 | 7/1997 |
| WO | 9736619 | 10/1997 |
| WO | 98 56370 | 12/1998 |
| WO | 9915292 | 4/1999 |
| WO | 9920312 | 4/1999 |
| WO | 99 56800 | 11/1999 |
| WO | 0009170 | 2/2000 |
| WO | 0144325 | 6/2001 |
| WO | 0204528 | 1/2002 |
| WO | 0209862 | 2/2002 |
| WO | 02051301 | 7/2002 |
| WO | 02088025 | 11/2002 |
| WO | 02094885 | 11/2002 |
| WO | 03007786 | 1/2003 |
| WO | 03007789 | 1/2003 |
| WO | 03011115 | 2/2003 |
| WO | 03015754 | 2/2003 |
| WO | 03039601 | 5/2003 |
| WO | 03049782 | 6/2003 |
| WO | 03075747 | 9/2003 |
| WO | 20040009664 | 1/2004 |
| WO | 2004026344 | 4/2004 |
| WO | 20040043292 | 5/2004 |
| WO | 20040054625 | 7/2004 |
| WO | 20040062531 | 7/2004 |
| WO | 2004064611 | 8/2004 |
| WO | 2004071536 | 8/2004 |
| WO | 2004080483 | 9/2004 |
| WO | 20040094625 | 11/2004 |
| WO | 20040101433 | 11/2004 |
| WO | 20040103208 | 12/2004 |
| WO | 20040105826 | 12/2004 |
| WO | WO 2005-012171 A2 * | 2/2005 |
| WO | 20050020849 | 3/2005 |
| WO | 20050021462 | 3/2005 |
| WO | 20050042045 | 5/2005 |
| WO | 20050051167 | 6/2005 |
| WO | 20050052051 | 6/2005 |
| WO | 20050065843 | 7/2005 |
| WO | 20050123594 | 12/2005 |
| WO | 2006069677 | 7/2006 |
| WO | 20060074809 | 7/2006 |
| WO | 20060077256 | 7/2006 |
| WO | 2006 0082221 | 8/2006 |
| WO | 2006 0097503 | 9/2006 |
| WO | 2007 0003513 | 1/2007 |
| WO | 20070003516 | 1/2007 |
| WO | 20070045616 | 4/2007 |

OTHER PUBLICATIONS

"Action of Electrolytes and Radiations-Jellies", The Hydrous Oxides of the Rare Earths, pp. 279-282.
V. Alexander, "Design and Synthesis of Macrocyclic Ligands and Their Complexes of Lanthanides and Actinides", Chem. Rev. 1995, vol. 95, pp. 273-342.
Markus Antonietti et al., "Single molecule Chemistry with Polymers and Colloids: A way to Handle complex Reactions and Physical Processes?", Chemphyschem, 2001, vol. 2, pp. 207-210.
Veronique Baldin et al., "Translocation of bFGF to the nucleus is $G_1$ phase cell cycle specific in bovine aortic endothelial cells", The EMBO Journal, 1990, vol. 9 No. 5, pp. 1511-1517.
Geetha Baskar et al., "Comblike Polymers with Octadecyl Side Chain and Carboxyl Functional Sites: Scope for Efficient Use in Miniemulsion Polymerization", Macromolecules 2000, vol. 33, pp. 9228-9232.
Serge L. Beaucage et al., "Tetrahedron Report No. 329: The Functionalization of Oligonucleotides Via Phosphoramidite Derivatives", Tetrahedron, vol. 49 No. 10, 1993, pp. 1925-1963.

Nina Bechthold et al., "Kinetics of Miniemulsion Polymerization as Revealed by Calorimetry", Macromolecules 2000, vol. 33, pp. 4682-4689.

N. Bechthold et al., "Miniemulsion Polymerization: Applications and New Materials", Macromol. Symp. 2000, vol. 151, pp. 549-555.

Claire Bonnerot et al., A b-galactosidase hybrid protein targeted to nuclei as a marker for developmental studies, Proc. Natl. Acad. Sci., 1987, vol. 84, pp. 6795-6799.

Teni Boulikas, "Putative Nuclear Localization Signals (NLS) in protein Transcription Factors", Journal Cellular Biochemistry, 1994, vol. 55, pp. 32-58.

Bridgette M. Budhlall et al., "Characterization of Partially Hydrolyzed Poly (Vinyl Alcohol). I. Sequence Distribution via H and C-NMR and a Reversed-phased Gradient Elution HPLC Technique", Macromol. Symp. 2000, vol. 155, pp. 63-84.

Deasey, "Polymerization Procedures for Nonbiodegradable Micro- and Nanocapsules and Particles", Marcel Dekker Inc., NY 1984, vol. 20, chapters 9 and 10.

Wolfgang K. D. Brill et al., "Synthesis of Oligodeoxynucleoside Phosphorodithioates via Thioamidites", J. Am. Chem. Soc. 1989, vol. 111, pp. 2321-2322.

Christina Carlsson et al., "Screening for genetic mutations", Nature, vol. 380, Mar. 21, 1996, p. 207.

Von. H. Casseraum, "Ubersichten Und Originale", Die Pharmazie, 1961, vol. 16, pp. 389-395.

T.M.S. Chang et al., "Semipermeable Aqueous Microcapsules", Canadian Journal of Physiology and Pharmacology, 1966, vol. 44 pp. 115-128.

T.M.S. Chang et al., "Semipermeable Microcapsules", Science, 1964, vol. 146 pp. 524-525.

Damien Colombie et al., "Competitive Adsorption of the Anionic Surfactant SLS and the Nonionic Surfactant X-405 on Polystyrene Latex Particles", Langmuir, 2000, vol. 16, pp. 7905-7913.

Robert O. Dempcy et al., "Synthesis of a thymidyl pentamer of deoxyribonucleic guanidine and binding studies with DNA homopolynucleoties", Proc. Natl. Acad. Sci. USA, Jun. 1995, vol. 92, pp. 6097-6101.

Daniele Derossi et al., "The Third Helix of the Antennapedia Homeodomain Transolocates through Biological Membranes", The Journal of Biological Chemistry, 1994, vol. 269 No. 14, pp. 10444-10450.

Colin Dingwall et al., "Protein Import into the Cell Nucleus", Ann Rev Cell Biol, 1986, vol. 2, pp. 367-390.

Colin Dingwall et al., "The Nucleoplasmin Nuclear Location Sequence is larger and more Complex than that of SV-40 Large T Antigen", Journal of Cell Biology, 1988, vol. 107, pp. 841-849.

Colin Dingwall et al., "A Polypeptide Domain that specifies Migration of Nucleoplasmin into the Nucleus", Cell, 1982 vol. 30, pp. 449-458.

F. Eckstein, "Oligonucleotides and Analogues: a Practical Approach", Oxford University Press, (1991).

Michael Egholm et al., "Peptide Nucleic Acids (PNA) Oligonucleotide Analogues with an Achiral Peptide Backbone", J. Am. Chem. Soc. 1992, vol. 114, pp. 1895-1897.

Michael Egholm et al., "PNA Hybridizes to complementary oligonucleotides obeying the Watson-Crick hydrogen-bonding rules", Nature 1993, vol. 365 pp. 566-568.

Stephen Fawell et al., "Tat-mediated delivery of heterologous proteins into cells", Proc. Natl. Acad. Sci., 1993, vol. 91, pp. 664-668.

E. Felder et al., "Radiopaque Contrast Media—XXIV—Syntheses and structure-activity relationships of new hexaiodinated radiopaque compounds", Farm Ed. Sci., 1973, vol. 28 pp. 912-924.

E. Felder et al., "Radiopaque Contrast Media—XXVII—Pharmacolgic properties of iodoxamic acid, and new contrast medium for intravenous cholegraphy", Farm Ed. Sci., 1973, vol. 28 pp. 996-1010.

Alan D. Frankel et al., "Cellular Uptake of the Tat Protein from Human Immunodeficiency Virus", Cell, 1988, vol. 55, pp. 1189-1193.

Deni S. Galileo et al., "Neurons and glia arise form a common progenitor in chicken optic tetum: Demonstration with two retroviruses and cell type-specific antibodies", Proc. Natl. Acad. Sci., vol., 1990, 87, pp. 458-462.

Xiaolian Gao et al., "Unusual conformation of a 3'-thioformacetal linkage in a DNA duples*", Journal of Biomolecualr NMR, 1994, vol. 4, pp. 17-34.

Sankar Ghosh et al., "Cloning of the p50 DNA Bindong Subunit of NF-kB: Homology to rel and dorsal", Cell, 1990, vol. 62, pp. 1019-1029.

Thomas Horn et al., "Oligonucleotides with Alternating Anionic and Cationic Phosphoramodate Linkages: Synthesis and Hybridization of Stereo-uniform Isomers", Pergamon, 1996, vol. 37 No. 6, pp. 743-746.

G.B. Hoey et al., "Synthesis of Derivatives of Isophthalamic Acid as X-Ray Contrast Agents", Chemical Research Dept., 1962, vol. 6, pp. 24-26.

G. Brooke Hoey et al., "X-ray media, II Syntheses of Alkanoylbis as X-ray Contrast Agents", Research Lab, 1966, vol. 9, pp. 964-966.

Susan C. Jackels, "Enhancement Agents for Magnetic Resonance and Ultrasound Imaging", Pharmaceuticals in Medical Imaging, Chapter 20, Section III, 1990, pp. 645-661.

Gareth N. Jenkins et al., "The Biosynthesis of Carbocyclic Nucleosides", Chemical Society of Reviews 1995, pp. 169-176.

Paul M. Jung et al., "Hybridization of Alternating Cationic/Anionic Oligonucleotides to RNA Segments", Nucleosides & Nucleotides, 1994 vol. 13, pp. 1597-1605.

Daniel Kalderon, "A short amino acid sequence able to specify nuclear location", Cell. 1984 vol. 39, pp. 499-509.

Gunter von Kiedrowski et al., "Parabolic Growth of a Self-replicating Hexadeoxynucleotide Bearing a 3'-5'-Phosphoamidate Linkage", Angew. Chem. Int. Ed. Engl., 1991, vol. 30 No. 4, pp. 423-426.

Stefan Kirsch et al., "Particle Morphology of Carboxylated Poly(b-butyl acrylate) / Poly (methyl methacrylate) Composite Latex Particles", Macromol. Symp. vol. 151, 2000, pp. 413-418.

S. Kirsch et al., "Particle Morphology of carboxylated poly-(n-butyl acrylate)/poly(methyl methacrylate) composite latex particles investigates by TEM and NMR", Acta. Polym. 1999, vol. 50, pp. 347-362.

E. Klieger et al., "Darstellung von Trijod-isophthalsaure-monoaminosaureamiden and ihre Verwendung als Rotgenkontratmittel", Arch. Pharmaz, 1973 pp. 834-845.

Von Martin Kramer, "Zur Pharmakologie von Kontrastmitteln fur die intravenose Cholangiographie", pp. 451-453, pp. 63-84.

Chris Meier et al., "Peptide Nucleic Acids (PNAs)-Unusual Properties of Nonionic Oligonucleotide Analogues", Chem. Int. Ed. Engl., 1992, vol. 31 No. 8, pp. 1008-1010.

Alain De Mesmaeker et al., "Comparison of Rigid and Flexible Backbones in Antisense Oligonucleotides", Pergamon 1994 vol. 4 No. 3, pp. 395-398.

J. A. Korver, "Synthesis of N-Acetyl-N(3-Amino-2, 4, 6-Triiodophenyl)-b-Aminoalkanoic acids suited for use as oral cholecystographic agents", Recueil, 1968, vol. 87, pp. 308-453.

Katharina Landfester et al., "Evidence for the preservation of the particle identity in miniemulsion polymerization", Macromol. Rapid Commun, 1999, vol. 20, pp. 81-84.

Katharina Landfester et al., "Polymerizable Miniemulsions" Macromolecules vol. 32, 1999, pp. 5223-5228.

Katharina Landfester et al., "Preparation of Polymer Particles in Nonaqueous Direct and Inverse Miniemulsions", Macromolecules 2000, vol. 33, pp. 2370-2376.

Katharina Landfester, "The Generation of Nanoparticles in Miniemulsions", Advanced Materials, 2001, vol. 13 No. 10, pp. 765-768.

Katharina Landfester, "Recations and Syntheses in Surfactant Systems; Heteophase Polymerization in Inverse Systems", Marcel Dekker, Inc. pp. 471-499 (2001).

Katharina Landfester et al., "Polyaddition in miniemulsions: A new route to polymer dispersions", Macromol. Chem. Phys. 2000, vol. 201, pp. 1-5.

Katharina Landfester et al., "The polymerization of acrylonitrile in miniemulsions: "Crumpled latex particles" or polymer nanocrystals", Macromol. Rapid Commun. 2000, vol. 21, pp. 820-824.

Katharina Landfester et al., "Polyreactions in Miniemulsions", Macromol. Rapid Commun. 2001, vol. 22, pp. 896-936.

Katharina Landfester et al., "Recent Developments in Miniemulsions-Formation and Stability Mechanisms", Macromol. Symp. 2000, vol. 150, pp. 171-178.

Katharina Landfester et al., "Miniemulsion Polymerization with Cationic and Nonionic Surfactants: A very Efficient use of Surfactants for Heterophase Polymerization", Macromolecules 1999, vol. 32, pp. 2679-2683.

A. A. Larsen et al., "Iodinated 3,5-Diaminobenzoic Acid Derivatives", Contribution from the Sterling-Winthrop Research Institute 1995, vol. 78, pp. 3210-3216.

R.L. Letsinger et al., "Effects of pendant groups at phosphorous on binding properties of d-ApA analogues", Nucleic Acids Research, 1986, vol. 14 No. 8, pp. 3487-3499.

Robert L. Letsinger et al., "Phosphoramidate Analogs of Oligonucleotides", J. Org. Chem., 1970, vol. 35 No. 11, pp. 3800-3803.

Robert L. Letsinger et al., "Cationic Oligonucleotides", J. Am. Chem. 1988, vol. 110 pp. 4470-4471.

C.C. Leznoff et al., "Phthalocyanines Properties and Applications", VCH Publishers, vol. 3, pp. 1-303, (1993).

Matthias Mag et al., "Synthesis and selective cleavage of a oligodeoxynucleotide containing a bridge internucleotide 5'-phosphorothioate linkage", Nucleic Acids Research, vol. 19 No. 7, pp. 1437-1441, (1991).

D. Meyer et al., "Advances in Macrocyclic Gadolinium Complexes as Magnetic Resonance Imaging Contrast Agents", Investigative Radiology, 1990, vol. 25, pp. S53-S55.

Gary Nolan et al., "DNA Binding and 1kB Inhibition of the Cloned p65 Subunit of NF-kB, a rel-Related Polypeptide", Cell, 1991, vol. 65, pp. 961-969.

Maryadele J. O'Neil et al., "The Merck Index" Thirteenth Edition, Merck & Co., Inc. 2001.

R. Pauwels et al., "Biological Activity of New 2-5A Analogues", Chemica Scripta, 1986 vol. 26, pp. 141-145.

Xiaogang Peng et al., "Epitaxial Growth of Highly Luminescent CdSe/CdS Core /Shell Nanocrystals with Photostability and Electronic Accessibility", J. Am Chem. Soc. 1997, vol. 119, pp. 7019-7029.

Pierce Chemical Company catalogue "Technical section on crosslinkers", 1994, pp. 155-200.

Hans Priewe et al., Formanidino-Derivate der b-[2.4.6-Trijod-3-amino-phenyl]-alkansauren, Chemische Berichte, 1960, pp. 2347-2352.

Bodo zu Putlitz et al., "The Generation of "Armored Latexes" and Hollow Inorganic Shells made of clay sheets by templating cationic miniemulsions and latexes", Adv. Mater. 2001, vol. 13, No. 7 pp. 500-503.

Bodo zu Putlitz et al., "New Cationic Surfactants with Sulfonium Headgroups", Langmuir 2000, vol. 16, pp. 3214-3220.

Bodo zu Putlitz et al., "Vesicle-Forming Single-Tail Hydrocarbon Surfactants with Sulfonium Headgroup", Langmuir 2000, vol. 16, pp. 3003-3005.

Rebecca L. Rawls, "Optimistic About Antisense", C&EN Washington, 1997, pp. 35-39.

G. Rosati et al., "Investigation of the Toxicology of a new Oral Contrast Medium for Cholecystography", Research Lab of Bracco Industria Chimica S.P.A., Milan, Italy, 1971, pp. 882-890.

J. Rottstegge et al., "Different types of water in the film formation process of latex dispersions as detected by solid-state nuclear magnetic resonance spectroscopy", Colloid Polym Sci. 2000, vol. 278, pp. 236-244.

Yogesh S. Sanghvi et al., "Carbohydrate Modifications in Antisense Research", ACS Symposium Series 580, 1994, chapters 2, 3, 6 and 7.

Naphtali Savion et al., "Nuclear Accumulation of Epidermal Growth Factor in Cultured Bovine Corneal Endothelial and Granulosa Cells", The Journal of Biological Chemistry 1981, pp. 1149-1154.

Hiroaki Sawai, "Synthesis and Properties of Oligoadenylic Acids Containing 2'-5' Phosphoramide Linkage", The Chemical Society of Japan 1984, pp. 805-808.

Robert S. Schwartz et al., "Drug-Eluting Stents in Preclinical Studies, Recommended Evaluation from a Consensus Group", Circulation 2002, pp. 1867-1873.

Mathias Sprinzl et al., "Enzymatic Incorporation of ATP and CTP Analogues into 3' End of tRNA", Eur. J. Biochem 1977, vol. 81, pp. 579-589.

Yoshio Sugii et al., Article from Japanese Pharm. Society, 1930, vol. 50, pp. 727-733.

Franca Tiarks et al., "Encapsulation of Carbon Black by Miniemulsion Polymerization", Macromol. Chem. Phys. 2001, vol. 202, pp. 51-50.

Franca Tiarks et al., "One-Step Preparation of Polyurethane Dispersions by Miniemulsion Polyaddition", Journal of Polymer Science 2001, vol. 39, pp. 2520-2524.

Franca Tiarks et al., "Preparation of Polymeric Nanocapsules by Miniemulsion Polymerization", Langmuir 2001, vol. 17, pp. 908-918.

Franca Tiarks et al., "Silica Nanoparticles as Surfactants and Fillers for Latexes Made by Miniemulsion Polymerization", Langmuir 2001, vol. 17, pp. 5775-5780.

V.H. Wallingford et al., "The Development of Organic Iodine Compounds as X-Ray Contrast Media", Scientific Edition, 1953, pp. 721-728.

R. Willstatter et al., "Annalen Der Chemie", Band 494, 1932 pp. 284-302.

English Translation of abstract of DE19651774.

PCT International Search Report for PCT/EP2005/014096.

* cited by examiner

COMPOSITE MATERIALS CONTAINING CARBON NANOPARTICLES

CROSS-REFERENCE TO RELATED APPLICATION(S)

This application claims priority from U.S. Patent Application Ser. No. 60/643,842, filed Jan. 13, 2005, the entire disclosure of which is incorporated herein by reference.

BACKGROUND OF THE INVENTION

Composite materials, in particular ceramics, are used as constructive materials for functionalized components of machines, devices or components and the like that may be exposed to high thermal and mechanical strains because of their mechanical properties and their thermal or chemical stability. In particular, porous ceramics are used increasingly in membranes, filters, catalysts or sensors because of their advantageous properties. In such applications, there is a need for functionalized composite materials, which exhibit certain electrical, di-electrical, magnetic or optic properties or even semi-conducting, ferromagnetic or super-conducting properties.

U.S. Pat. No. 6,255,241 describes a method of producing fullerene dispersed ceramics, wherein a so-called micelle formation-method is used that forms $C_{60}$ micelles to enable uniform distribution of the carbon-based particles within the resulting material. This conventional method further requires drying of the sol or gel as well as a subsequent heat-treatment to obtain the ceramic material.

U.S. Pat. No. 6,066,272 describes optical glasses and polymers that incorporate homogeneously dispersed fullerene molecules via the sol/gel-process, resulting in materials having an application as optical filters.

Disadvantages of common ceramics are the brittleness of the material as one of the problems in connection with their forming process into stable two or three-dimensional structures. In addition, different thermal extension coefficients of the (different) raw materials might lead to stress within the formed materials if components of the ceramic materials are e.g. applied together with metallic components.

If sintering processes are applied to form ceramic materials, the size and distribution of pores generally cannot be controlled, and may lead to an embrittlement of the substrate for the case of metallic substrates under typical thermal conditions, and thus adversely affect the properties of the material.

Furthermore, these materials are formed by thermal treatment under high pressure and/or high temperature conditions by sintering green bodies. Such processes can be costly, and may also require a lot of post-processing effort to form the finished material.

SUMMARY OF THE INVENTION

One object of the present invention is to provide a process for the production of composite materials that allows for the "tailoring" of the material properties including, e.g., resistance to mechanical stress, electrical conductivity, impact strength or optical properties.

Another object of the present invention is to provide new composite materials, wherein the porosity of the formed material can be varied for use in several fields of application without adversely affecting the physical and chemical stability.

A further object of the present invention is to provide a method for the production of composite materials, in which the conversion of a sol/gel into the composite material allows a robust sintering process to achieve extremely stable materials.

In one exemplary embodiment of the present invention, a process for producing materials is provided comprising:
a) forming a sol/gel by reacting at least one chemically-modified carbon nanoparticle with at least one sol/gel forming component;
b) optionally adding organic polymer material to the so formed sol/gel; and
c) converting the resulting mixture into a solid composite material.

These and other exemplary embodiments are described by or are obvious from, and encompassed by, the description provided herein.

BRIEF DESCRIPTION OF THE DRAWINGS

The following description, given by way of example, but not intended to limit the invention solely to the specific exemplary embodiments described, may best be understood in conjunction with the accompanying drawings, in which.

DETAILED DESCRIPTION OF EXEMPLARY EMBODIMENTS

Figure 1:
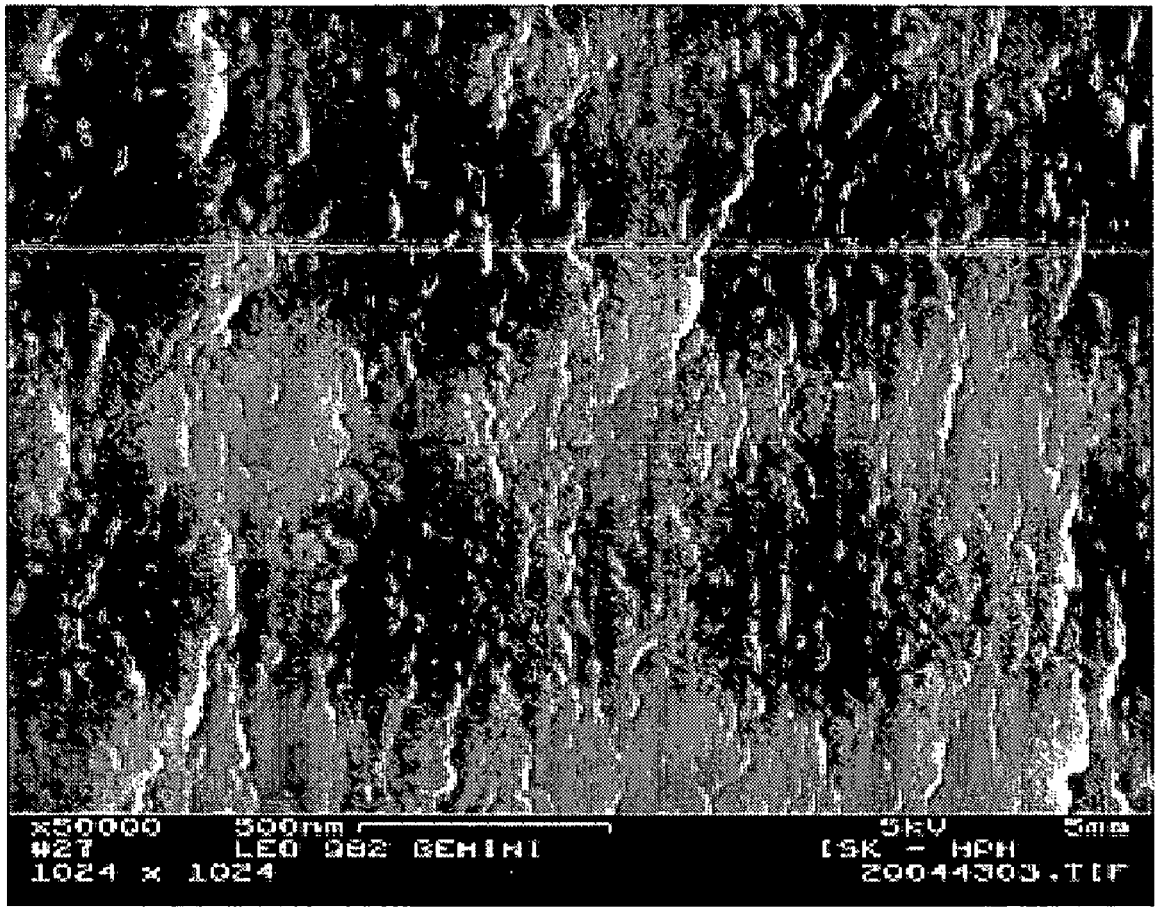
FIG. 1 is an SEM picture (magnification 50,000×) illustrating the surface of a gel produced according to Example 3 before an oxidative pyrolysis, and showing a substantially uniform distribution of fullerene particles in a solid gel network.

A sol/gel-process can be widely applied to build up different types of material networks. The linkage of the components under formation of the sol or gel can take place in several conventional ways, e.g. via hydrolytic or non-hydrolytic sol/gel processing.

The term "sol/gel" as used within this specification can mean (but is not limited to) either a sol or a gel. The sol can be converted into a gel by, for example, ageing, curing, raising of pH, evaporation of solvent, or any other conventional methods.

The composite materials produced according to certain exemplary embodiments of the present invention can comprise carbon-based nanoparticles, and may advantageously exhibit minimal mass and/or volume shrinkage when processed at low temperatures from sols or gels.

Sols prepared in accordance with exemplary embodiments of the present invention may also be suitable for coating of almost any type of substrate with porous or non-porous film coatings. Thin or thick coatings, as well as shaped bulk materials, may be obtained.

Carbon Nanoparticles

In certain exemplary embodiments of the present invention, the carbon nanoparticles may be fullerene molecules, in particular $C_{36}$-$C_{60}$-, $C_{70}$-, $C_{76}$-, $C_{80}$-, $C_{86}$-, $C_{112}$-fullerenes or any mixtures thereof. Nano-tubes may also be suitable for use in other exemplary embodiments of the present invention, including MWNT, SWNT, DWNT; random-oriented nanotubes, as well as fullerene onions or metallo-fullerenes, carbon fibres, soot particles or graphite particles; and any combinations thereof and combinations thereof with fullerenes.

The carbon nanoparticles may be chemically modified by functionalization with suitable linker groups which are capable of reacting with the sol/gel forming component to form polar or nonpolar groups which can be further reacted and incorporated into the sol or gel network using conventional sol/gel process technology. Polar and nonpolar groups that can be suitable linker groups may be selected from the group comprising primary, secondary or tertiary amino groups, straight chain or branched, substituted or unsubstituted alkyl-, alkenyl-, alkynyl-, cycloalkyl-, cycloalkenyl-, cycloalkynyl-, aryl-, alkylaryl-, arylalkyl-, alkenylaryl-, arylalkenyl-, alkynylaryl-, arylalkynyl-groups; alkyl-metal alkoxides, halogens, aromatic or aliphatic alcohol groups, pyrrolidine groups, phthalocyanine groups, carboxyl, carboxylate, esters, ethers, organofunctional silanes, aminofunctional silanes, and the like.

Modifications of the carbon-based nanoparticle can be achieved by nucleophilic addition reagants, cycloaddition reagants, alkylation reagants, halogenation reagants, carboxylation reagents, or by covalent coupling with polar groups, such as pyrrolidine, amino-, phathalocyanine-groups or other suitable functional groups that allow incorporation of the modified nanoparticles into the sol/gel network.

Further specific modification methods for carbon nanoparticles are described in U.S. Pat. No. 6,203,814. These methods may be utilized in accordance with certain exemplary embodiments of the present invention.

Reagents that may be used to chemically modify the nanoparticles include, for example, 3-aminopropyltrimethoxysilane, 3-aminopropyl-triethoxysilane, 2-Aminoethyl-3-aminopropyltrimethoxysilane, triaminofunctional propyltrimethoxysilane (Dynasilan® TRIAMO), N-(n-butyl)-3-aminopropyltrimethoxysilane, 3-aminopropylmethyldiethoxysilane, 3-glycidyloxypropyltrimethoxysilane, 3-glycidyloxypropyltriethoxysilane, vinyltrimethoxysilane, vinyltriethoxysilane, 3-mercaptopropyltrimethoxysilane, 6-amino-1-hexanol, 2-(2-aminoethoxy)ethanol, cyclohexylamine, butyric acid cholesterylester (PCBCR), 1-(3-methoxycarbonyl)propyl)-1-phenylester, or combinations thereof.

In certain exemplary embodiments of the present invention, the carbon nanoparticles may be oxidized before functionalizing them, e.g., by treatment with oxidizing agents such as nitric acid, molecular oxygen, and the like.

In some exemplary embodiments, mixtures of nanoparticles having different specifications/modifications can be used to affect the resultant properties of the material.

The carbon nanoparticles may be modified covalently, for example, under reducing conditions. This may be achieved via the alkylation and/or hydrogenation of carbon-nanotubes and nanotube-like species using various wet chemical metal reduction reactions, for example, treatment with carbanion complexes of alkaline metals in the presence of alkyl halides and methanol, for the production of alkylated and/or hydrogenated carbon species, or by oxidative functionalization with the use of acids. For example, oxidation resulting in a carboxylation of the carbon nanoparticles and/or nanotubes allows for a subsequent condensation reaction with alkyl amines or a direct poly-condensation with amines and the like, or subsequent esterification reactions with suitable reactants.

Further exemplary embodiments of the present invention include, for example, conventional addition reactions with nitrenes, carbenes or radicals, reductive electrochemical coupling with aryl diazonium salts, or a 1,3-dipolar cyclo-addition of azomethine ylidene, for example, by decarboxylization of immonium salts.

The carbon nanoparticles, including nanotubes and similar nanomorphous species, may be modified non-covalently, for example, by coating the particles with surfactants, non-ionic or ionic polymers, including but not limited to polyethylene glycol (PEG), or by adsorption of polymerizable monomers, DANN, proteins, glucoseamines, cylodextrine, and similar suitable substances.

In certain exemplary embodiments of the present invention, the chemical modification of the carbon-nanoparticles may be performed as a separate step, before combining the modified particles with sol/gel forming components.

Alternatively, a chemical modification of the carbon nanoparticles may be performed in situ, while forming the sol/gel. In these exemplary embodiments of the present invention, any of the sol/gel forming agents mentioned herein may also act, at least in part, as a modification reagent to covalently modify the carbon nanoparticles. However, the reagents used for modifying the nanoparticles may be different from the sol/gel components.

The average size of carbon nanoparticles (before chemical modification) used may be in the range of about 0.5 nm to 500 nm, and preferably about 0.5 nm to 100 nm, or more preferably about 0.7 nm to 50 nm. The particle size may be either the diameter or the length of the particle. The particle sizes can be provided as an average particle size, which may be determined by laser methods such as the TOT-method (Time-Of-Transition), which may be determined, e.g., on a CIS Particle Analyzer of Ankersmid. Further suitable methods for determining particle size include powder diffraction or TEM (Transmission-Electron-Microscopy).

In some exemplary embodiments of the present invention, the carbon nanoparticles can be incorporated into polymers in the configuration of core/shell or core/sheath particles, in which the shell or sheath phase completely or incompletely encapsulates the carbon-based nanoparticle core. If the polymer cannot be incorporated into the sol/gel network itself, it should be suitably modified with functional groups to allow direct incorporation into the sol/gel network. The polymers comprising the carbon-based nanoparticles are preferably covalently incorporated into the sol/gel network and may then be further processed to form desired materials.

The encapsulation of the carbon-based nanoparticles into the polymers may be achieved by various conventional polymerization techniques, e.g. dispersion, suspension, or emulsion polymerization. Polymers that may be used include, but are not limited to, PMMA, polystyrol or other latex-forming polymers, polyvinyl acetate, or conducting polymers. These polymer capsules that contain the carbon-based nanoparticles can be further modified, for example by linking lattices and/or further encapsulations with polymers such as elastomers, or they may be coated by metal oxides, metal salts or other suitable metal compounds, e.g. metal alkoxides. The application of encapsulated carbon-based nanoparticles may help to prevent aggregation, and the precursor material can be processed without agglomerating and/or affecting the composite material. Conventional techniques may be used to modify the polymers, if necessary, depending on the requirements of the individual composition to be used in the exemplary process.

By chemically modifying the carbon-based nanoparticle, the solid content of the resulting material may be varied significantly. Suitable chemical modifications may be selected to optimize the solubility, dispersion, or the degree of suspension or emulsification. The solid content of the carbon nanoparticles in the composite material according to exemplary embodiments of the present invention range from about 0.1% to 90%, or from about 1% to 90%, preferably from about 5% to 90%, or even more preferably from about 20% to 70%. (For example, the percentages are in weight percent referenced to the total weight of the composite material produced by the processes described herein.)

Sol/Gel Forming Components

The sol/gel forming components used in the process according to certain exemplary embodiments of the present invention may be selected from alkoxides, oxides, acetates, nitrates of various metals e.g. silicon, aluminum, boron, magnesium, zirconium, titanium, alkaline metals, alkaline earth metals, or transition metals including platinum, molybdenum, iridium, tantalum, bismuth, tungsten, vanadium, cobalt, hafnium, niobium, chromium, manganese, rhenium, iron, gold, silver, copper, ruthenium, rhodium, palladium, osmium, lanthanum and lanthanides, as well as combinations thereof.

In some exemplary embodiments of the present invention, the sol/gel forming components may comprise metal oxides, metal carbides, metal nitrides, metaloxynitrides, metalcarbonitrides, metaloxycarbides, metaloxynitrides, and metaloxycarbonitrides of the above mentioned metals, or any combinations thereof. These compounds, preferably in the form of colloidal particles, can be reacted with oxygen containing compounds, e.g. alkoxides, to form a sol/gel, or may be added as fillers if not in colloidal form.

In certain exemplary embodiments of the present invention, at least one sol/gel forming component may be selected from alkoxides, metal alkoxides, colloidal particles, or metal oxides and the like. The metal alkoxides that may be used as sol/gel forming components include conventional chemical compounds that are used in a variety of applications that have the general formula $M(OR)_x$ wherein M is any metal from a metal alkoxide which may hydrolyze and polymerize in the presence of water. R is an alkyl radical of 1 to 20 carbon atoms, which may be straight chained or branched, and x has a value equivalent to the metal ion valence. In certain exemplary embodiments metal alkoxides such as $Si(OR)_4$, $Ti(OR)_4$, $Al(OR)_3$, $Zr(OR)_3$ and $Sn(OR)_4$ may be used. Specifically, R may be the methyl, ethyl, propyl or butyl radical. Further examples of suitable metal alkoxides include $Ti(isopropoxy)_4$, $Al(isopropoxy)_3$, $Al(sec-butoxy)_3$, $Zr(n-butoxy)_4$ and $Zr(n-propoxy)_4$.

Other suitable alkoxides may include silicon alkoxides such as tetraalkoxysilanes, wherein the alkoxy may be branched or straight chained and may contain 1 to 20 carbon atoms, e.g. tetramethoxysilane (TMOS), tetraethoxysilane (TEOS) or tetra-n-propoxysilane, as well as oligomeric forms thereof. Also suitable are alkylalkoxysilanes, wherein alkoxy is defined as above and alkyl may be a substituted or unsubstituted, branched or straight chain alkyl having 1 to 20 carbon atoms, e.g. methyltrimethoxysilane (MTMOS), methyltriethoxysilane, ethyltriethoxysilane, ethyltrimethoxysilane, methyltripropoxysilane, methyltributoxysilane, propyltrimethoxysilane, propyltriethoxysilane, isobutyltriethoxysilane, isobutyltrimethoxysilane, octyltriethoxysilane, octyltrimethoxysilane, commercially available from Degussa AG, Germany, methacryloxydecyltrimethoxysilane (MDTMS); aryltrialkoxysilanes like phenyltrimethoxysilane (PTMOS), phenyltriethoxysilane, commercially available from Degussa AG, Germany; phenyltripropoxysilane, and phenyltributoxysilane Phenyl-tri-(3-glycidyloxy)-silane-oxide (TGPSO), 3-aminopropyltriethoxysilane, 3-aminopropyl-triethoxysilane, 2-aminoethyl-3-aminopropyltrimethoxysilane, triaminofunctional propyltrimethoxysilane (Dynasylan® TRIAMO, available from Degussa AG, Germany), N-(n-butyl)-3-aminopropyltrimethoxysilane, 3-aminopropylmethyldiethoxysilane, 3-glycidyloxypropyltrimethoxysilane, 3-glycidyloxypropyltriethoxy-silane, vinyltrimethoxysilane, vinyltriethoxysilane, 3-mercaptopropyltrimethoxy-silane, Bisphenol-A-glycidylsilanes; (meth)acrylsilanes, phenylsilanes, oligomeric or polymeric silanes, epoxysilanes; fluoroalkylsilanes like fluoroalkyltrimethoxysilanes, fluoroalkyltriethoxysilanes with a partially or fully fluorinated, straight chain or branched fluoroalkyl residue of 1 to 20 carbon atoms, e.g. tridecafluoro-1,1,2,2-tetrahydrooctyltriethoxysilane and modified reactive flouroalkylsiloxanes available from Degussa AG under the trade names Dynasylan® F8800 and F8815; as well as any mixtures of the foregoing.

In another exemplary embodiment of the present invention, sols/gels are prepared from carbon-based nanoparticles and alkaline metal salts, e.g. acetates, as well as acids such as phosphorous acids, pentoxides, phosphates, or organo-phosphorous compounds such as alkyl phosphonic acids. Specific examples include calcium acetate, phosphorous acid, $P_2O_5$, as well as triethyl phosphite as a sol in ethanediol, whereby biodegradable composites may be prepared from carbon-based nanoparticles and physiologically acceptable inorganic components. By varying the stoichiometric Ca/P-ratio, the degeneration rate may be adjusted. The molar ratio of Ca to P may be about 0.1 to 10, or preferably about 1 to 3.

In some exemplary embodiments of the present invention, the sols/gels may be prepared from colloidal solutions that may comprise carbon-based nanoparticles, preferably in solution, dispersion or suspension in polar or nonpolar solvents, including aqueous solvents as well as cationically or anionically polymerizable polymers as precursors, such as alginate. By addition of suitable coagulators, e.g. inorganic or organic acids or bases, in particular acetates and diacetates, carbon containing composite materials may be produced by precipitation or gel formation. Optionally, further particles may be added to adjust the properties of the inventive material. Such particles can include, e.g., metals, metal oxides, metal carbides, or mixtures thereof, as well as metal acetates or diacetates.

The sol/gel components used in the present invention may also comprise colloidal metal oxides, including those colloidal metal oxides which are stable long enough to be able to combine with the other sol/gel components and the chemically modified carbon nanoparticles. Such colloidal metal oxides include $SiO_2$, $Al_2O_3$, $ZrO_2$, $TiO_2$, $SnO_2$, $ZrSiO_4$, $B_2O_3$, $La_2O_3$, $ZrO(NO_3)_2$ and $Sb_2O_5$. Further examples of sol/gel forming components may include aluminumhydroxide sols or gels, aluminumtri-sec-butylat, AlOOH-gels, and the like.

Some of these colloidal sols are acidic in the sol form and, therefore, additional acid need not be added to the hydrolysis medium when they are used during hydrolysis. These colloidal sols can also be prepared by a variety of methods. For example, titania sols having a particle size in the range of about 5 to 150 nm can be prepared by the acidic hydrolysis of titanium tetrachloride, by peptizing hydrous $TiO_2$ with tartaric acid, or by peptizing ammonia washed $Ti(SO_4)_2$ with hydrochloric acid. See, e.g., Weiser, Inorganic Colloidal Chemistry, Vol. 2, p. 281 (1935). In order to preclude the incorporation of contaminants in the sols, the alkyl orthoesters of the metals may be hydrolyzed in an acid pH range of about 1 to 3 in the presence of a water miscible solvent, wherein the colloid is present in the dispersion in an amount of about 0.1 to 10 weight percent.

In some exemplary embodiments of the present invention, the sol/gel forming components may be metal halides of the metals mentioned above, which may be reacted with oxygen-functionalized carbon nanoparticles to form the desired sol/gel.

Oxygen-containing sol/gel forming compounds, e.g. alkoxides, ethers, alcohols or acetates, may be reacted with suitably functionalized carbon-based nanoparticles.

When the sol/gel is formed by a hydrolytic sol/gel-process, the molar ratio of the added water and the sol/gel forming component, e.g. alkoxides, oxides, acetates, nitrides or combinations thereof, is preferably in the range of about 0.001 to 100, or preferably from about 0.1 to 80, or more preferably from about 0.2 to 30.

In a typical hydrolytric sol/gel processing procedure according to certain embodiments of the present invention, the sol/gel components are blended with the chemically modified carbon nanoparticles in the presence of water, and optionally in the presence of further solvents or mixtures thereof. Further additives may be added, including but not limited to surfactants, fillers, and the like, as described in more detail below. Optionally, organic polymer may be added to the mixture, and it may be dissolved or present as a suspension, emulsion or dispersion in a solvent such as water, organic solvent, or mixtures thereof. Further additives, such as crosslinkers, may also be added, as well as catalysts for controlling the hydrolysis rate of the sol or for controlling the crosslinking rate. Such catalysts are described in further detail below. Such processing is similar to conventional sol/gel processing.

Non-hydrolytic sol/gel processing may be performed in a manner similar to that described above, except that it may be performed essentially in the absence of water. If the sol/gel is formed by a non-hydrolytic sol/gel-process or by chemically linking the components with a linker, the molar ratio of the halide and the oxygen-containing compound may be in the range of about 0.001 to 100, or preferably about 0.1 to 140, or more preferably from about 0.1 to 100, or even more preferably about 0.2 to 80.

In nonhydrolytic sol/gel processes, the use of metal alkoxides and carboxylic acids or carboxylic acid functionalized carbon nanoparticles and their derivatives are also suitable in certain exemplary embodiments of the present invention. Suitable carboxylic acids include acetic acid, acetoacetic acid, formic acid, maleic acid, crotonic acid, or succinic acid.

Non-hydrolytic sol/gel processing in the absence of water may be accomplished by reacting alkylsilanes or metal alkoxides with anhydrous organic acids, acid anhydrides, acid esters, or the like. Acids and their derivatives may be suitable as sol/gel components or for modifying/functionalizing carbon nanoparticles.

Therefore, in some exedemplary embodiments of the present invention, at least one sol/gel forming component in nonhydrous sol/gel processing may be selected from anhydrous organic acids, acid anhydrides or acid esters such as formic acid, acetic acid, acetoacetic acid, succinic acid maleic acid, crotonic acid, acrylic acid, methacrylic acid, partially or fully fluorinated carboxylic acids, their anhydrides and esters, e.g. methyl- or ethylesters, or any mixtures of the foregoing. It may be preferred to use acid anhydrides in admixture with anhydrous alcohols, wherein the molar ratio of these components determines the amount of residual acetoxy groups at the silicon atom of the alkylsilane employed.

Typically, according to the degree of cross-linking desired in the resulting sol/gel, either acidic or basic catalysts may be applied, particularly in hydrolytic sol/gel processes. Suitable inorganic acids can include, for example, hydrochloric acid, sulfuric acid, phosphoric acid, nitric acid, as well as diluted hydrofluoric acid. Suitable bases include, for example, sodium hydroxide, ammonia and carbonate, as well as organic amines. Suitable catalysts in non-hydrolytic sol/gel processes include anhydrous halide compounds, for example $BCl_3$, $NH_3$, $AlCl_3$, $TiCl_3$, or mixtures thereof.

To affect the hydrolysis in hydrolytic sol/gel processing steps in exemplary embodiments of the present invention, the addition of solvents may be used. It may be preferable to use water-miscible solvents, including water-miscible alcohols or mixtures of water-miscible alcohols. Especially suitable are alcohols such as methanol, ethanol, n-propanol, isopropanol, n-butanol, isobutanol, t-butanol and lower molecular weight ether alcohols such as ethylene glycol or monomethyl ether. Sometimes it may be preferable to use small amounts of non-water-miscible solvents such as toluene.

Additives

The properties of composite materials produced in accordance with certain exemplary embodiments of the present invention, e.g. resistance to mechanical stress, electrical conductivity, impact strength or optical properties, may be varied by application of suitable amounts of additives, particularly by the addition of organic polymer materials.

Organic polymer materials may be added to the sol/gel blend to further modify the resulting properties of the composite materials. Suitable organic polymer materials may be selected from homopolymers or copolymers of aliphatic or aromatic polyolefins such as polyethylene, polypropylene, polybutene, polyisobutene, polypentene; polybutadiene; polyvinyls such as polyvinyl chloride or polyvinyl alcohol, poly(meth)acrylic acid, polymethylmethacrylate (PMMA), polyacrylocyano acrylate; polyacrylonitril, polyamide, polyester, polyurethane, polystyrene, polytetrafluoroethylene; polymers such as collagen, albumin, gelatine, hyaluronic acid, starch, celluloses such as methylcellulose, hydroxypropyl cellulose, hydroxypropyl methylcellulose, carboxymethylcellulose phthalate; waxes, paraffin waxes, Fischer-Tropsch waxes; casein, dextrans, polysaccharides, fibrinogen, poly(D,L-lactides), poly(D,L-lactide coglycolides), polyglycolides, polyhydroxybutylates, polycarbonates, polyalkyl carbonates, polyorthoesters, polyesters, polyhydroxyvaleric acid, polydioxanones, polyethylene terephthalates, polymaleate acid, polytartronic acid, polyanhydrides, polyphosphazenes, polyamino acids; polyethylene vinyl acetate, silicones; poly(ester urethanes), poly(ether urethanes), poly (ester ureas), polyethers such as polyethylene oxide, polypropylene oxide, pluronics, polytetramethylene glycol; polyvinylpyrrolidone, poly(vinyl acetate phthalate), alkyd resin, chlorinated rubber, epoxy resin, formaldehyde resin, (meth)acrylate resin, phenol resin, alkyl phenol resin, amine resin, melamine resin, vinyl ester resin, Novolac® epoxy resin, as well as their copolymers, shellac, organic materials of renewable raw materials, and mixtures or combinations of these homopolymers or copolymers. Further suitable organic materials include, e.g., polyacetylenes, polyanilines, poly (ethylenedioxythiophenes), polydialkylfluorenes, polythiophenes, polyparaphenylenes, polyazines, polyfuranes, poly-p-phenylensilfides, polyselenophenes or polypyrroles, monomers, oligomers or polymers thereof, which may be used to increase the electrical conductivity of the composite materials formed, even after the gels have been converted in an optional pyrolysis step.

Especially preferable in some exemplary embodiments of the present invention can be the use of fullerenes or other carbon nanoparticles encapsulated in polymers as an organic polymer material to be added to the sol/gel mixture. The carbon nanoparticles may be encapsulated for this purpose into shells of almost any of the above-mentioned polymers by conventional dispersion, suspension, or emulsion polymerization methods. Polymers that may be used for this purpose include PMMA, polystyrene or polyvinylacetate, and electrically conductive polymers may also be used.

The organic polymer material may be added to the sol/gel in an amount of about 1 to 90 weight %, or preferably in an amount of about 5 to 60 weight % of the resulting composite material.

In some exemplary embodiments of the present invention, further additives that do not react with the components of the sol/gel may be added to the sol/gel forming composition. Examples of such additives include fillers, pore-forming agents, metals and metal powders, and the like. Examples of inorganic additives and fillers include silicon oxides and aluminum oxides, aluminosilicates, zeolites, zirconium oxides, titanium oxides, talc, graphite, carbon black, fullerenes, clay materials, phyllosilicates, silicides, nitrides, or metal powders, in particular those of catalytically active transition metals such as copper, gold and silver, titanium, zirconium, hafnium, vanadium, niobium, tantalum, chromium, molybdenum, tungsten, manganese, rhenium, iron, cobalt, nickel, ruthenium, rhodium, palladium, osmium, iridium or platinum.

By means of such additives in the formed composite materials, it is possible to further vary and adjust the mechanical, optical and thermal properties of the material, which can be particularly suitable for producing coatings having specific desired properties.

Further suitable additives include fillers, crosslinkers, plasticizers, lubricants, flame resistant materials, glass or glass fibers, carbon fibers, cotton, fabrics, metal powders, metal compounds, silicon, silicon oxides, zeolites, titan oxides, zirconium oxides, aluminum oxides, aluminum silicates, talcum, graphite, soot, phyllosilicates, and the like. The use of fillers may be particularly preferred.

In other exemplary embodiments, the sol/gel network is further modified by the addition of at least one crosslinking agent to the mixture of sol/gel components, modified nanoparticles and optionally the organic polymer material. The crosslinking agent may be selected from, for example, isocyanates, silanes, diols, di-carboxylic acids, (meth)acrylates such as 2-hydroxyethyl methacrylate, propyltrimethoxysilane, 3-(trimethylsilyl)propyl methacrylate, isophoron diisocyanate, and the like. Biocompatible crosslinkers such as diethylentriaminoisocyanate and 1,6diisocyanatohexan may be preferred, especially in processes wherein the sol/gel is converted into the solid composite material at relatively low temperatures, e.g. below 100° C. By using suitable crosslinkers in combination with the incorporation of carbon nanoparticles into the inventive composites, an anisotropic porosity, i.e., a gradient of the pore size through the composite material, may be obtained, as in Examples 3 and 4 below. This anisotropic porosity may be further influenced by fillers, as discussed herein.

Fillers may be used to modify the size and the degree of porosity. In some exemplary embodiments non-polymeric fillers are preferred. Non-polymeric fillers may be any substance that can be removed or degraded, for example by thermal treatment or other conditions, without adversely affecting the material properties. Some fillers may be resolved in a suitable solvent and can then be removed in this manner from the material. Furthermore, non-polymeric fillers, which are converted into soluble substances under the chosen thermal conditions, can also be applied. In some exemplary embodiments of the present invention, these non-polymeric fillers may be, for example, anionic, cationic or non-ionic surfactants, which can be removed or degraded by thermal treatment.

In another exemplary embodiment of the present invention, the fillers may be inorganic metal salts, particularly salts from alkaline and/or alkaline earth metals, including but not limited to alkaline or alkaline earth metal carbonates, sulfates, sulfites, nitrates, nitrites, phosphates, phosphites, halides, sulfides, oxides, as well as mixtures thereof. Further suitable fillers include organic metal salts, e.g. alkaline or alkaline earth and/or transition metal salts, in particular formiates, acetates, propionates, malates, maleates, oxalates, tartrates, citrates, benzoates, salicylates, phtalates, stearates, phenolates, sulfonates, and amines, as well as mixtures thereof.

In still another exemplary embodiment of the present invention, polymeric fillers may be applied. Suitable polymeric fillers include saturated, linear or branched aliphatic hydrocarbons, which may further be homo- or copolymers. Polyolefins such as polyethylene, polypropylene, polybutene, polyisobutene, polypentene, as well as copolymers and mixtures thereof, may be used. Furthermore, polymer particles formed of methacrylates or polystearine, as well as conducting polymers such as polyacetylenes, polyanilines, poly(ethylenedioxythiophenes), polydialkylfluorenes, polythiophenes or polypyrroles, may also be used as polymeric fillers.

In the above-described procedures, soluble fillers may be used together with polymeric fillers, which are volatile under thermal conditions or can be converted into volatile compounds during thermal treatment. In this way the pores formed by the polymeric fillers can be combined with the pores formed by the other fillers to achieve an anisotropic pore distribution.

Suitable particle sizes of the non-polymeric fillers can be determined based on the desired porosity and/or size of the pores of the resulting composite material.

Porosity in composite materials according to certain exemplary embodiments of the present invention may be produced by treatment processes such as those described in German publication DE 103 35 131 and PCT application PCT/EP04/00077.

Other additives useful in certain exemplary embodiments include drying-control chemical additives such as glycerol, DMF, DMSO or any other suitable high boiling point or viscous liquid, for suitably controlling the conversion of the sols to gels and solid composites.

Solvents

Suitable solvents that may be used for the removal of the fillers after thermal treatment of the material include, for example, (hot) water, diluted or concentrated inorganic or organic acids or bases, and the like. Suitable inorganic acids include, for example, hydrochloric acid, sulfuric acid, phosphoric acid, or nitric acid, as well as diluted hydrofluoric acid. Suitable bases include, for example, sodium hydroxide, ammonia, carbonate, as well as organic amines. Suitable organic acids include, for example, formic acid, acetic acid, trichloromethane acid, trifluoromethane acid, citric acid, tartaric acid, oxalic acid, and mixtures thereof.

In some exemplary embodiments of the present invention, coatings of the composite materials may be applied as a liquid solution or dispersion or suspension in a suitable solvent or solvent mixture, with subsequent drying or evaporation of the solvent. Suitable solvents may include, for example, methanol, ethanol, N-propanol, isopropanol, butoxydiglycol, butoxyethanol, butoxyisopropanol, butoxypropanol, n-butyl alcohol, t-butyl alcohol, butylene glycol, butyl octanol, diethylene glycol, dimethoxydiglycol, dimethyl ether, dipropylene glycol, ethoxydiglycol, ethoxyethanol, ethyl hexane diol, glycol, hexane diol, 1,2,6-hexane triol, hexyl alcohol, hexylene glycol, isobutoxy propanol, isopentyl diol, 3-methoxybutanol, methoxydiglycol, methoxyethanol, methoxyisopropanol, methoxymethylbutanol, methoxy PEG-10, methylal, methyl hexyl ether, methyl propane diol, neopentyl glycol, PEG-4, PEG-6, PEG-7, PEG-8, PEG-9, PEG-6-methyl ether, pentylene glycol, PPG-7, PPG-2-buteth-3, PPG-2 butyl ether, PPG-3 butyl ether, PPG-2 methyl ether, PPG-3 methyl ether, PPG-2 propyl ether, propane diol, propylene glycol, propylene glycol butyl ether, propylene glycol propyl ether, tetrahydrofurane, trimethyl hexanol, phenol, benzene, toluene, xylene; as well as water, which may be present as a mixture with dispersants, surfactants, or other additives, as well as mixtures of the above-named substances. Any of the above-mentioned solvents may also be used in the sol/gel process.

Preferred solvents include organic solvents such as ethanol, isopropanol, n-propanol, dipropylene glycol methyl ether and butoxyisopropanol (1,2-propylene glycol-n-butyl ether), tetrahydrofurane, phenol, benzene, toluene, xylene, preferably ethanol, isopropanol, n-propanol and/or dipropylene glycol methyl ether, as well as mixtures thereof. Isopropanol or n-propanol may be preferred in certain exemplary embodiments of the present invention.

The fillers can be partly or completely removed from the material depending on the nature and time of treatment with the solvent. The complete removal of the filler may be preferable.

Conversion

In some exemplary embodiments of the present invention, the sol or gel formed by the process may be converted into a solid composite material. Conversion of the sol into gel may be accomplished by such methods as ageing, curing, raising of pH, evaporation of solvent, or other conventional methods. The sol may first be converted into a gel and subsequently converted into a solid composite material, or the sol may be directly converted into a composite material, particularly where the materials used result in polymeric glassy composites.

The conversion may be achieved by drying the sol or gel. In some exemplary embodiments, this drying step can comprise a thermal treatment of the sol or gel, which may optionally be a pyrolysis or carbonization step, in the range of about −200 C to 3500 C, preferably in the range of about −100° C. to 2500° C., more preferably in the range of about −50° C. to 1500° C. or about 0° C. to 1000° C., and most preferably about 50° C. to 800° C.

In some exemplary embodiments of the present invention, a thermal treatment may be performed by laser applications, e.g. by selective laser sintering (SLS).

Atmosphere

The conversion of the sol/gel into the solid material can be performed under various conditions. The conversion may be performed in different atmospheres, e.g., inert atmosphere such as like nitrogen, $SF_6$, or noble gases such as argon, or any mixtures thereof, or in an oxidizing atmosphere such as oxygen, carbon monoxide, carbon dioxide, nitrogen oxide, and the like, or any mixtures thereof. Furthermore, an inert atmosphere may be blended with reactive gases, e.g. hydrogen, ammonia, $C_1$-$C_6$ saturated aliphatic hydrocarbons such as methane, ethane, propane and butene, any mixtures thereof, or other oxidizing gases.

In some exemplary embodiments, the atmosphere during the thermal treatment may be substantially free of oxygen. In certain embodiments, the oxygen content is preferably below about 10 ppm, or preferably below about 1 ppm.

In some other exemplary embodiments of the present invention, the material resulting from the thermal treatment may be further treated with oxidizing and/or reducing agents. In certain exemplary embodiments, the material may be treated at elevated temperatures in oxidizing atmospheres. Examples of oxidizing atmospheres include oxygen, carbon monoxide, carbon dioxide, nitrogen oxide, or similar oxidizing agents. The oxidizing agent can also be mixed with inert atmospheres, such as noble gases. Partial oxidation may be preferably accomplished at elevated temperatures in the range of about 50 C to 800 C.

Liquid oxidizing agents may also be applied to achieve partial oxidation of the material. Liquid oxidizing agents can include, for example, concentrated nitric acid, which may preferably contact the material at temperatures above room temperature.

In further exemplary embodiments of the present invention, high pressure may be applied to form the material. One optional conversion step can include drying under supercritical conditions, for example drying in supercritical carbon monoxide, leading to highly porous Aerogel composites. In other exemplary embodiments of the present invention, reduced pressure or a vacuum may be applied to convert the sol/gel into the desired composite material.

Suitable conditions including temperature, atmosphere, and/or pressure may be used depending on the desired property of the resultant material. The choice of such conditions may depend at least in part on the components used to form the material.

Composite Material

Carbon nanoparticles may still be present in the material without undergoing decomposition, depending on the conditions used. In some exemplary embodiments of the present invention, the chemical bond between the carbon-based nanoparticle and the sol/gel forming compounds may still be present.

By oxidative and/or reductive treatment or by the incorporation of additives, fillers or functional materials, the properties of the composites produced according to certain exemplary methods of the present invention can be influenced and/or modified in a controlled manner. For example, it is possible to render the surface properties of the composite hydrophilic or hydrophobic in nature by incorporating inorganic nanoparticles or nanocomposites such as layer silicates.

According to exemplary methods of the present invention, the composite material may be modified, e.g., by varying the pore sizes using suitable oxidative or reductive post-treatment steps, such as oxidation in the air at elevated temperatures, boiling in oxidizing acids or alkalis, or admixing volatile components which are degraded completely during the conversion step and leave pores behind in the carbon-containing layer.

Coatings or bulk materials made according to some exemplary embodiments of the present invention may be structured before or after conversion into the inventive composite by folding, embossing, punching, pressing, extruding, gathering, injection molding and the like, before or after being applied to the substrate or being molded or formed. In this way, certain structures of a regular or irregular type may be incorporated into the composite coatings produced.

The exemplary sols or gels can be further processed by conventional techniques, e.g., they may be used to build molded paddings and the like or to form coatings on a variety of substrates. The molded paddings can be produced in any appropriate forms, including but not limited to pipes, bead-moldings, plates, blocks, cuboids, cubes, spheres, or hollow spheres, or any other three-dimensional structure, for example elongated structures, bar-shaped or rod-like plate-shaped, or polygonal such as triangular, tetrahedral, pyramidal, octahedral, dodecahedral, ikosahedral, rhomboidal, prismatic, or spherical shapes such as ball-shaped, spheroid or cylindrical, lens-shaped, ring-shaped, honeycomb-shaped, and the like.

By applying multi-layered half-finished molded shapes, asymmetric constructions can be realized by the resultant composite material. The material can be brought into the desired form by applying conventional techniques, e.g. by casting processes such as sand casting, shell molding, full mold processes, die casting or centrifugal casting, or by pressing, sintering, injection molding, compression molding, blow molding, extrusion, calendaring, fusion welding, pressure welding, jiggering, slip casting, dry pressing, drying, firing, filament winding, extrusion, lamination, autoclaving, curing or braiding.

Coatings from sols/gels may be applied in liquid, pulpy, or pasty form, for example, by painting, furnishing, phase-inversion, dispersing, atomizing or melt coating, extruding, slip casting, dipping, or as a hot melt. If the sol or gel is in a solid state it may be applied by powder coating, flame spraying, sintering, or the like onto a suitable substrate. Dipping, spraying, spin coating, ink-jet-printing, microdrop coating, or 3-D-printing may also be used. The coating in some exemplary embodiments of the present invention may be applied to an inert substrate, dried, and optionally thermally treated, where the substrate is either thermally stable or thermally unstable. This may lead to a substantially complete degradation of the substrate, such that the coating remains after the thermal treatment having the desired form of the resulting composite material.

Gels may be processed by any conventional technique including but not limited to folding, stamping, punching, printing, extruding, die casting, injection molding, reaping and the like. Furthermore, coatings may be obtained by a transfer process, in which the gels are applied to the substrates as a lamination. The coated substrates may be cured and subsequently the coating can be released from the substrate and may be thermally treated. The coating of the substrate can be obtained by suitable printing procedures, e.g. thrust bearing printing, scraping, spraying techniques or thermal laminations or wet-in-wet laminations. More than one thin layer may be applied to ensure an error-free composite film.

By applying the above-mentioned transfer procedure, it is also possible to form multi-layer gradient films from different layers or different sequences of layers, which, after conversion into the composite material, produce gradient materials in which the density of the material varies from place to place.

In another exemplary embodiment of the present invention, the sol or gel may be dried or thermally treated and commuted by suitable conventional techniques, for example by grinding in a ball mill or roller mill and the like. The commuted material can be used as a powder, a flat blank, a rod, a sphere, a hollow sphere and the like, and can be processed by conventional techniques to form granulated or extruded particulates in various forms. Hot-pressure procedures, optionally accompanied by suitable binders, may be used to form the composite material.

Additional processing options can include the formation of powders by other conventional techniques such as spray-pyrolysis or precipitation, or the formation of fibers by spinning-techniques, including gel-spinning. Another processing option is drying under supercritical conditions to form aerogels.

Thermal treatment according to an exemplary method of the present invention can lead to powders or dried gels for the formation of xerogels or aerogels, or for curing of the material, yielding desired properties such as porosity or degree of sintering.

Depending on the temperature chosen for the thermal treatment and the specific composition of the material, composite materials can be obtained, in particular ceramic- and composite half-finished materials, molded paddings and coatings, whose structures may range from amorphous to fully crystalline.

In certain exemplary embodiments, a solvent-free gel may be used by application of temperatures below 0 C. It may be preferable that no specific thermal treatment is performed, especially when processing the sols/gels further at room temperature to preserve properties of the material, for example for sensor or optical applications.

Certain exemplary embodiments of the present invention are further described below by way of the following non-limiting examples.

EXAMPLE 1

Modification of the Carbon-Based Nanoparticle 1 g of a fullerene mixture of $C_{60}$ and $C_{70}$ (Nanom-Mix, FCC, Japan) was mixed together with 99 g of 3-aminopropyl-trimethoxysilane (Dynasylan® AMMO, available from Degussa AG, Germany) in a water bath at 50° C. under continuous stirring (20 rpm) for 20 h to yield a red-brown liquid.

EXAMPLE 2

2 g of the above-mentioned silane-modified fullerene liquid mixture was reacted with 0.5 g of TEOS (Dynasil® A, available from Degussa AG, Germany) and 0.5 g of concentrated $H_2SO_4$ and stirred (20 rpm) for approximately 4 h at room temperature, resulting in a homogeneous gel. Subsequently, 1.0 g of a phenoxy resin (Beckopox EP 401, UCB Solutia) and 22.5 g of MEK were added to the gel, to yield a dispersion. After applying the dispersion onto glass and steel substrates, the samples were each tempered at 300° C. for 30 minutes. The films were homogeneous, translucent and of yellowish color. The fullerene-containing samples exhibited a surface resistance of $10^9$ Ohms, whereas the polymer film did not reveal any anti-static or conducting resistance. The films were scratch-resistant and elastic, whereby a 90° folding of the coated steel did not show any flaking or cracks within the film.

EXAMPLE 3

4 g of the above-mentioned fullerene mix (Nanom, FCC) was stirred (20 rpm) with 16 g of 2-aminoethyl-3-aminopropyltrimethoxysilane (Dynasylan® DAMO, available from Degussa AG, Germany) at 50° C. for 20 h. 4 g of the resulting liquid mixture containing modified fullerene and residual silane was gelled with 1 g of concentrated HCl, 1 g Tween® 20 (surfactant), 0.5 g of water, and 1.0 g of a phenoxy resin (Beckopox EP 401, UCB Solutia). Thereafter, isophorondi-isocyanat was slowly added. The resulting material was cured under ambient conditions at room temperature. FIG. 1 is an SEM picture (magnification 50,000×) of the surface of this gel, which reveals a very uniform distribution of the fullerene particles in the solid gel network.

Figure 2:
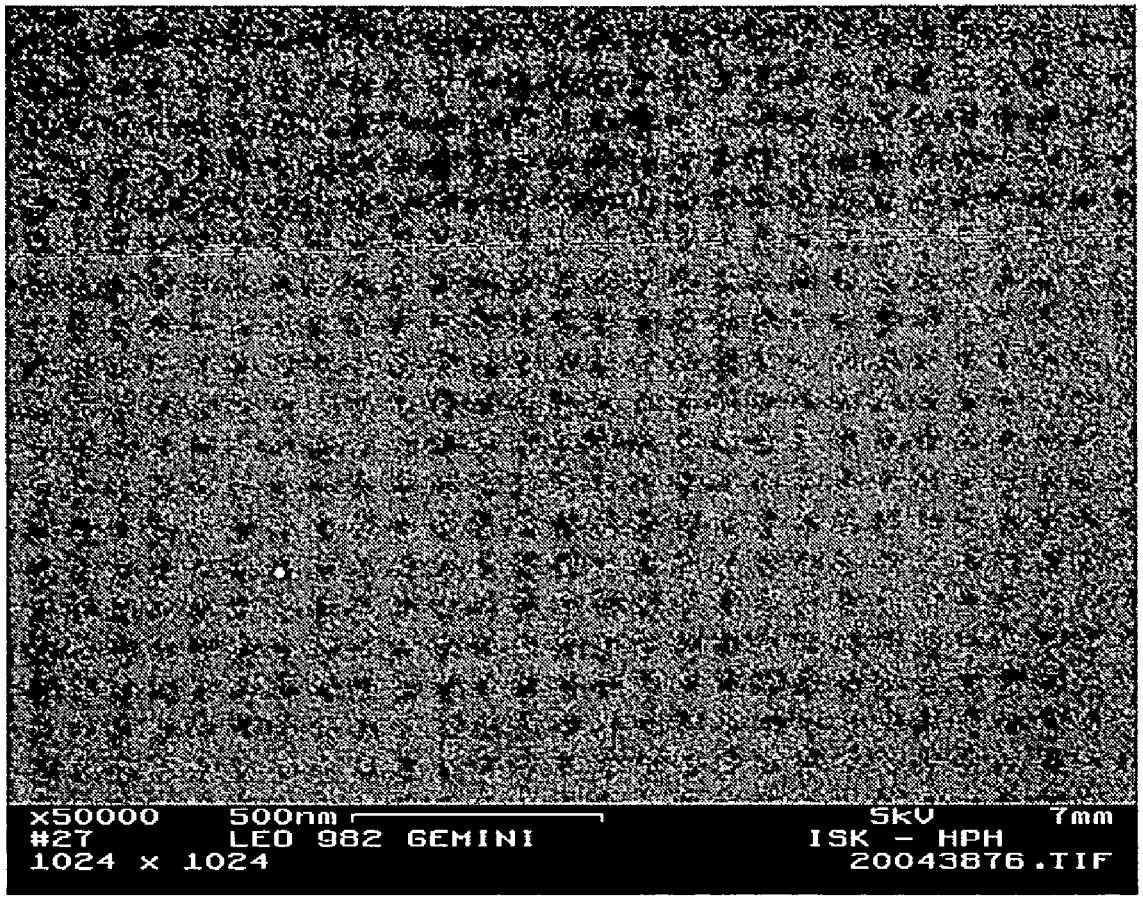
FIG. 2 is an SEM picture (magnification 50,000×) of substantially the same material as shown in FIG. 1 after the oxidative pyrolysis, showing a uniform porosity of about 1 nm average pore size.

The solid material was then carbonized oxidatively at 150° C. SEM analysis revealed a porous structure with an average pore size of 1 nm at the surface and cutting edge, as shown in FIG. 2. The specific surface area was revealed to be 4000 $m^2/g$, as measured by helium absorption according to the BET method.

EXAMPLE 4

4 g of an AMMO-modified fullerene liquid mixture prepared as described in Example 1 with a weight ratio of fullerene:AMMO of 1:20 was stirred (20 rpm) with 16 g TEOS (Dynasil® A, available from Degussa AG, Germany), 2 g Tween® 20 (surfactant) and a prepared solution of 3 g water, 3 g ethanol and 3 g concentrated HCl for 6 h. To the resulting sol, 2 g Aerosil®R972 (Degussa AG) and 4 g P25 (titanium oxide nanoparticles, Degussa AG) were added and a homogeneous paste was obtained. With constant stirring, 1 g of 1,6diisocyanatohexane (Sigma Aldrich) was added as a gas-forming crosslinker. After 10 minutes, the mass was transferred into a cylindrical glass mold and dried at 30° C. The dried hardened cylindrical body formed in the mold was subsequently washed in ethanol and then further dried at room temperature. The resulting body of composite material revealed a macroporous structure with average pore sizes in the range of 5-10 μm. SEM pictures revealed additional micropores, with average pore sizes in the range of 10-20 nm, located in the walls of the macropores.

EXAMPLE 5

Figure 3:
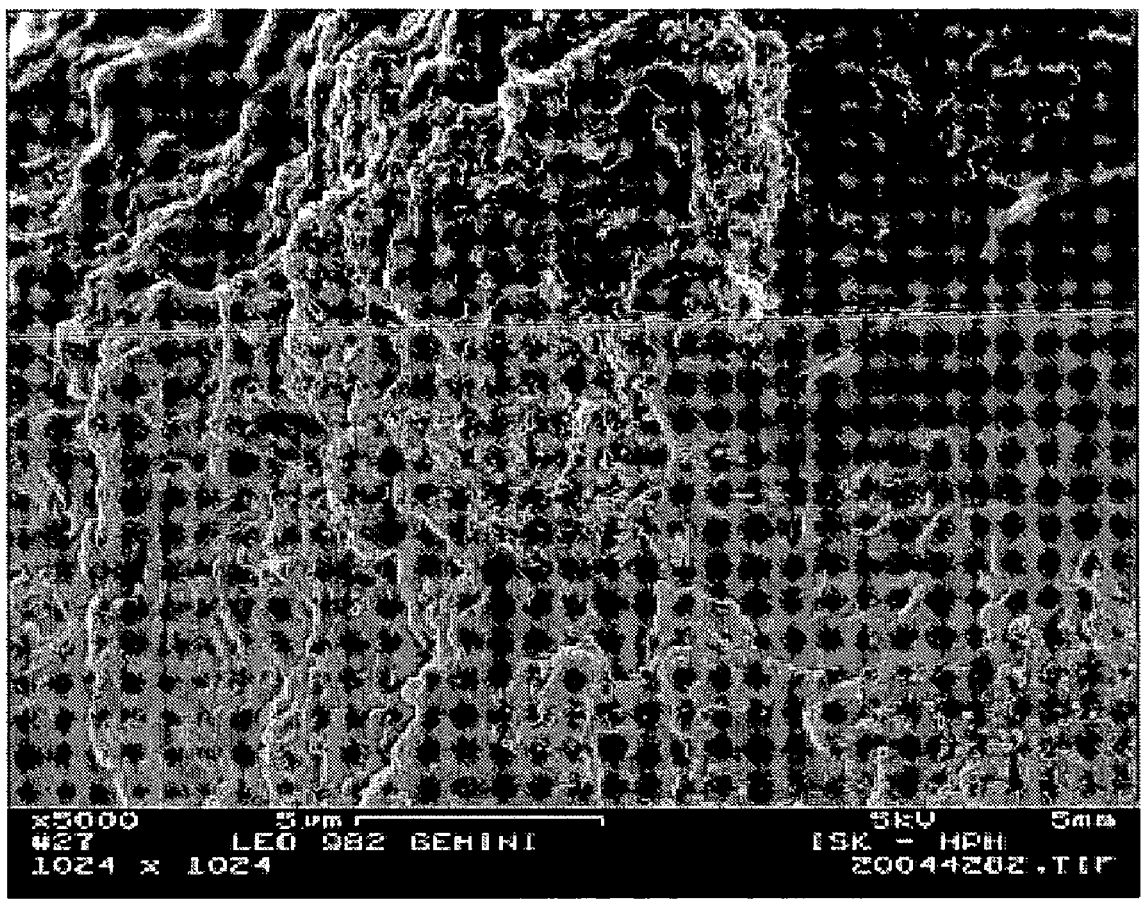
FIG. 3 is an SEM picture (magnification 5,000×) illustrating a fracture edge surface of a cylindrical composite material body produced according to Example 5.

4 g of an AMMO-modified fullerene liquid mixture prepared as described in Example 1 with a weight ratio of fullerene:AMMO of 1:20 was stirred (20 rpm) with 16 g of TEOS (Dynasil® A, available from Degussa AG, Germany), 2 g of Tween® 20 (surfactant) and a prepared solution of 3 g water, 3 g ethanol and 3 g of concentrated HCl for 6 h. To the resulting sol, 2 g of Aerosil®R972 (Degussa AG) and 6 g of polyethylenglycol PEO 100000 were added. With constant stirring, 1 g of 1,6diisocyanatohexane (Sigma Aldrich) was added as a gas-forming crosslinker. After 10 minutes, the mass was transferred into a cylindrical glass mold and dried at 30° C. The dried, hardened, cylindrically-shaped body formed in the mold was subsequently washed with ethanol in an ultrasonic bath at 70° C. for 6 hours and then dried again at room temperature. The resulting body of composite material revealed a macroporous structure with an average pore sizes in the range of 5-10 μm. SEM pictures revealed additional micropores, with average pore sizes in the range of 30-60 nm, located in the walls of the macropores. FIG. 3 is an SEM picture (magnification 5,000×) of the fracture edge surface of the cylindrical composite material body produced according to this example.

Having thus described in detail several exemplary embodiments of the present invention, it is to be understood that the invention described above is not to be limited to particular details set forth in the above description, as many apparent variations thereof are possible without departing from the spirit or scope of the present invention. The embodiments of the present invention are disclosed herein or are obvious from and encompassed by the detailed description. The detailed description, given by way of example, but not intended to limit the invention solely to the specific embodiments described, may best be understood in conjunction with the accompanying Figures.

The foregoing applications, and all documents cited therein or during their prosecution ("appln. cited documents") and all documents cited or referenced in the appln. cited documents, and all documents cited or referenced herein ("herein cited documents"), and all documents cited or referenced in the herein cited documents, together with any manufacturer's instructions, descriptions, product specifications, and product sheets for any products mentioned herein or in any document incorporated by reference herein, are hereby incorporated herein by reference, and may be employed in the practice of the invention. Citation or identification of any document in this application is not an admission that such document is available as prior art to the present invention. It is noted that in this disclosure and particularly in the claims, terms such as "comprises," "comprised," "comprising" and the like can have the meaning attributed to them in U.S. Patent law; e.g., they can mean "includes," "included," "including" and the like; and that terms such as "consisting essentially of" and "consists essentially of" can have the meaning ascribed to them in U.S. Patent law, e.g., they allow for elements not explicitly recited, but exclude elements that are found in the prior art or that affect a basic or novel characteristic of the invention.

What is claimed is:

1. A process for manufacturing at least one composite material, comprising:
    forming a sol/gel by covalently bonding at least one carbon nanoparticle with at least one sol/gel forming component;
    adding an organic polymer material to the sol/gel to form a resulting mixture;
    converting the resulting mixture into a solid composite material, and
    adding at least one filler to the resulting mixture, wherein the filler does not react with the components of the sol/gel and the at least one filler comprises polymer encapsulated carbon nanoparticles,
    wherein the polymer encapsulated carbon nanoparticles are carbon nanoparticles that are encapsulated into a shell of a polymer by one of dispersion, suspension or emulsion polymerization, and
    wherein the at least one sol/gel forming component comprises at least one of an alkoxide, a metal alkoxide, a metal oxide, a metal acetate, a metal nitrate, or a metal halide.

2. The process of claim 1, wherein the at least one sol/gel forming component is selected from the group consisting of silicon alkoxides including oligomeric forms thereof; alkylalkoxysilanes; aryltrialkoxysilanes, phenyltributoxysilane; phenyl-tri-(3-glycidyloxy)-silane-oxide (TGPSO), aminoalkylsilanes; 3-glycidyloxypropyltrimethoxysilane, 3-glycidyloxypropyltriethoxy-silane, bisphenol-A-glycidylsilanes; (meth)acrylsilanes, phenylsilanes, oligomeric silanes, polymeric silanes, epoxysilanes; fluoroalkylsilanes, or any mixture of the foregoing.

3. The process of claim 1, wherein the at least one sol/gel forming component comprises a metal halide, and wherein the at least one carbon nanoparticle is an oxygen-functionalized carbon nanoparticle comprising at least one of an alkoxide-, an ether-, an ester-, an alcohol-, or an acetate-functionalized carbon nanoparticle.

4. The process of claim 1, wherein the sol/gel comprises water and a molar ratio of water to the at least one sol/gel forming component which is between about 0.001 to 100.

5. The process of claim 1, wherein the sol/gel is formed in the presence of an organic solvent, and the solvent content of the sol/gel is between about 0.1% and 90%.

6. The process of claim 1, wherein the organic polymer material added to the sol/gel comprises at least one of a homo- or copolymer of aliphatic polyolefins, aromatic polyolefins, polyethylene, polypropylene, polybutene, polyisobutene, polypentene; polybutadiene; polycarbonate; polynorbornylene, polyalkyne, polydimethylsiloxane, polyethyleneterephthalate, nylons, polyvinylics including polyvinylchloride and polyvinylalcohol, poly(meth)acrylic acid, polyacrylonitrile, polyamide, polyester, polyurethane, polystyrene, polytetrafluoroethylene, waxes, paraffin waxes, Fischer-Tropsch-waxes, paracyclophane, alkyd resin, fluorinated rubber, epoxy resin, acrylic resin, phenolic resin, amine resin, tar, tar-like materials, tar pitch, bitumen, starch, cellulose, shellac, organic materials from renewable raw materials, or any mixtures, copolymers or combinations of any of the foregoing.

7. The process of claim 1, wherein the converting step comprises drying the resulting mixture.

8. The process of claim 7, wherein the drying step comprises a thermal treatment in the range of about −200° C. to 3500° C.

9. The process of claim 7, wherein the drying step is performed under at least one of a reduced pressure or a vacuum.

10. The process of claim 1, further comprising adding at least one crosslinking agent to the resulting mixture, wherein the crosslinking agent is selected from the group consisting of isocyanates, silanes, (meth)acrylates, or a mixture of any of the foregoing.

11. The process of claim 1, further comprising removing at least a portion of the at least one filler from the solid composite material.

12. The process of claim 1, wherein the at least one carbon nanoparticle is selected from the group consisting of: fullerene molecules, $C_{36}$-$C_{60}$-, $C_{70}$-, $C_{76}$-, $C_{80}$-, $C_{86}$-, or $C_{112}$-fullerenes, fullerene onions, metallo-fullerenes, soot particles, or graphite particles, or any mixtures thereof; nanotubes, MWNT, SWNT, DWNT, randomly-oriented nanotubes, fullerene onions, metallo-fullerenes, carbon fibers, soot particles, or graphite particles.

13. The process of claim 1, wherein the at least one carbon nanoparticle is chemically modified by at least one linker group that is capable of reacting with the at least one sol/gel forming component.

14. The process of claim 13, wherein the at least one linker group is selected from the group consisting of primary, secondary or tertiary amino groups; unsubstituted straight chain alkyl-, alkenyl-, alkynyl-, cycloalkyl-, cycloalkenyl-, cycloalkynyl-, aryl-, alkylaryl-, arylalkyl-, alkenylaryl-, arylalkenyl, alkynylaryl-, or arylalkynyl-groups; unsubstituted branched alkyl-, alkenyl-, alkynyl-, cycloalkyl-, cycloalkenyl-, cycloalkynyl-, aryl-, alkylaryl-, arylalkyl-, alkenylaryl-, arylalkenyl-, alkynylaryl-, or arylalkynyl-groups; substituted straight chain alkyl-, alkenyl-, alkynyl-, cycloalkyl-, cycloalkenyl-, cycloalkynyl-, aryl-, alkylaryl-, arylalkyl-, alkenylaryl-, arylalkenyl-, alkynylaryl-, or arylalkynyl-groups; substituted branched alkyl-, alkenyl-, alkynyl-, cycloalkyl-, cycloalkenyl-, cycloalkynyl-, aryl-, alkylaryl-, arylalkyl-, alkenylaryl-, arylalkenyl-, alkynylaryl-, or arylalkynyl-groups; alkyl-metal alkoxides, halogens, aromatic alcohol groups, aliphatic alcohol groups, pyrrolidine groups, phthalocyanine groups, carboxyls, carboxylates, esters, and ethers.

15. The process of claim 14, wherein the at least one carbon nanoparticle is chemically modified by reaction with at least one of 3-aminopropyltrimethoxysilane, 3-aminopropyl-triethoxysilane, 6-amino-1-hexanol,2-(2-aminoethoxy)ethanol, cyclohexylamine, butyric acid choleterylester (PCBCR), and 1-(3-methoxycarbonyl)-propyl)-1-phenylester.

16. The process of claim 13, wherein the at least one carbon nanoparticle has an average particle size before chemical modification of about 0.5 nm to 500 nm.

17. The process of claim 13, wherein the at least one carbon nanoparticle has an average particle size before chemical modification of about 0.5 nm to 100 nm.

18. The process of claim 13, wherein the at least one carbon nanoparticle has an average particle size before chemical modification of about 0.7 nm to 50 nm.

19. A process for manufacturing at least one composite materials, comprising:
forming a sol/gel by covalently bonding at least one carbon nanoparticle with at least one sol/gel forming component;
adding an organic polymer material to the sol/gel to form a resulting mixture;
converting the resulting mixture into a solid composite material; and
adding at least one filler to the resulting mixture, wherein the filler does not react with the components of the sol/gel and the at least one filler comprises polymer encapsulated carbon nanoparticles,
wherein the at least one carbon nanoparticle only includes spherical carbon nanoparticles,
wherein the at least one carbon nanoparticle is chemically modified by the at least one sol/gel forming component, and
wherein the polymer encapsulated carbon nanoparticles are carbon nanoparticles that are encapsulated into a shell of a polymer by one of dispersion, suspension or emulsion polymerization, and
wherein the at least one sol/gel forming component comprises at least one of an alkoxide, a metal alkoxide, a metal oxide, a metal acetate, a metal nitrate, or a metal halide.

20. The process of claim 19, wherein the spherical carbon nanoparticles include fullerene molecules.

* * * * *